United States Patent [19]

Hergenrother et al.

[11] 4,175,181
[45] Nov. 20, 1979

[54] POLYPHOSPHAZENE POLYMERS CONTAINING CYANAMIDO OR DICYANAMIDO SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,107

[22] Filed: Sep. 8, 1978

[51] Int. Cl.$^2$ ............................................. C08G 83/00
[52] U.S. Cl. ..................................... 528/168; 528/374; 528/399
[58] Field of Search ........................ 528/168, 399, 374

[56] References Cited

U.S. PATENT DOCUMENTS 3,344,087  9/1967  Becke et al. ........................ 528/399

FOREIGN PATENT DOCUMENTS 2712542  9/1977  Fed. Rep. of Germany ........... 528/399

Primary Examiner—Wilbert J. Briggs, Sr.

[57] ABSTRACT

Polyphosphazene polymers are prepared which contain repeating units represented by the formulas:

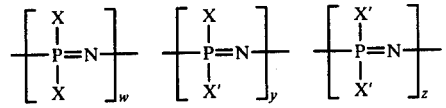

wherein X and X' are the same or differnt and are represented by:

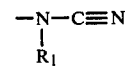

wherein $R_1$ is selected from a group consisting of hydrogen and —CN; X' may additionally be selected from the group consisting of substituted and unsubstituted alkoxy, aryloxy, mercapto and amino groups and $20 \leq (w+y+z) \leq 50,000$ per polymer.

The polymers of the invention can be utilized to form protective films and can also be utilized in applications such as for molding, coatings, foams and the like.

18 Claims, No Drawings

POLYPHOSPHAZENE POLYMERS CONTAINING CYANAMIDO OR DICYANAMIDO SUBSTITUENTS

BACKGROUND OF THE INVENTION

Polyphosphazene polymers containing repeating

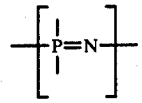

in which various substituted and unsubstituted alkoxy, aryloxy, mercapto and amino groups are attached to the phosphorus atom and their methods of preparation are described in the prior art as illustrated in the publication "Nitrogen-Phosphorus Compounds", Academic Press, New York, N.Y., 1972 by H. R. Allcock and "Poly(Organophosphazenes)", Chemtech, Sept. 19, 1975 by H. R. Allcock and in such U.S. Pat. Nos. 3,515,688; 3,702,833; 3,856,712; 3,974,242 and 4,042,561 the disclosures of which are herein incorporated by reference.

However, none of the aforementioned publications and patents or for that matter, none of the prior art of which the applicants are aware, discloses or suggests polyphosphazene homopolymers or copolymers containing cyanamido or dicyanamido substituents attached to the phosphorus atom or methods of preparing such polymers.

SUMMARY OF THE INVENTION

This invention relates to polyphosphazene homopolymers and copolymers containing repeating

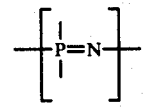

in the polymer chain in which cyanamido substituents are attached to the phosphorus atom. More particularly, the invention relates to polyphosphazene polymers having substituents which are derived from cyanamide and an alkali metal salt of dicyanamide and to a method of preparing such polymers. Optionally, and other substituent groups, such as substituted and unsubstituted alkoxy, aryloxy, amino or mercapto groups, which are compatible with the cyanamido and dicyanamido substituents and are known in the polyphosphazene state of the art can be substituted onto the polyphosphazene in addition to the cyanamido and dicyanamido substituents. These optional substituents can be substituted onto the polyphosphazene by the method disclosed in the present invention or by prior art methods.

DETAILED DESCRIPTION OF THE INVENTION

The polymers of the invention contain repeating units represented by the formulas:

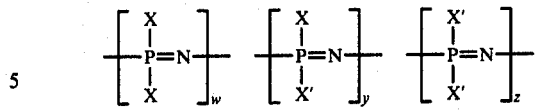

wherein X and X' are the same or different and are represented by:

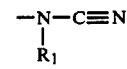

wherein $R_1$ is selected from the group consisting of hydrogen and —CN; X' can additionally be selected from the group consisting of substituted and unsubstituted alkoxy, aryloxy, amino and mercapto groups. The polymer can contain from 20 to 50,000 of such units such that $20 \leq (w+y+z) \leq 50,000$.

It is understood that when X and X' are the same, a homopolymer is formed and when X and X' are different substituent groups a copolymer is formed. While in some instances it is preferable that all X's be the same, the X substituent can consist of a mixture of cyanamido and dicyanamido substituents and the X' substituent, when X' is different from X, can consist of a mixture of different substituent groups selected from substituted or unsubstituted alkoxy, aryloxy, mercapto and amino groups. The substitution on the various substituted groups can be any "non-reactive" substituent; i.e., a substituent which is non-reactive with the various materials present during polymer formation. Suitable substituents include chlorine, bromine, nitro, cyano, phenoxy, alkoxy and the like.

A benefit in the substitution of cyanamido or dicyanamido substituents onto the polyphosphazene polymer is that these substituents increase the solvent resistance of the polyphosphazene polymer.

The phosphazene polymers of the invention can be represented by the formula:

$$[NP (X)_a(X')_b]_n$$

wherein n is from 20 to 50,000 and a+b=2 and a and b are greater than zero. The percentage of X in (X+X') when X' represents a substituent other than cyanamido or dicyanamido should be at least, about two mole % to receive the benefit of the cyanamido or dicyanamido substituent with respect to molding, foam, or coating applications.

When the term polymer is used hereafter it will include within its meaning both the homopolymer and the copolymer of the substituted polyphosphazene polymer.

Where the presence of crosslinking functionality is desired, in a polymer otherwise free of unsaturated crosslinking functionality, crosslinking functionality can be introduced in the polymer molecule through the use of ethylenically unsaturated substituent groups in addition to the group X and X' set forth above. Examples of suitable crosslinking moieties and methods for their cure are set forth in U.S. Pat. No. 4,055,520; 4,061,606; 4,073,824; 4,073,825; and 4,076,658 which are hereby incorporated by reference and include —OCH=CH and OR$_3$CF=CF$_2$, as well as similar groups which contain unsaturation. Generally, when present, the moieties containing crosslinking functionality are usefully present in an amount between 0.1 mole % to about 50 mole % and usually between about 0.5 mole % and about 10 mole % based on the replaceable chlorine in the starting poly(dichlorophosphazene).

The polymers of the invention can be utilized to form protective films and can also be utilized in applications such as molding, coatings, foams, films and the like.

METHODS OF PREPARATION

The polymers are prepared by reacting a poly(dichlorophosphazene) having the formula —(NPCl$_2$)$_n$— in which n is from 20 to 50,000, in the presence of a tertiary amine with either cyanamide, an alkali metal salt of dicyanamide, or a mixture of cyanamide or an alkali metal salt of dicyanamide with any compound which is reactive with the poly(dichlorophosphazene) to form a substitution group on a phosphorus atom in the poly(dichlorophosphazene) which is known in the state of the art. Examples of such compounds are discussed in the section entitled "Additional Reactive Compounds" below.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula —(NPCl$_2$)$_n$—, in which n may range from 20 to 50,000 or more. As described in the aforementioned references, the polymers are in general prepared by the thermal polymerization of cyclic oligomers having the formula (NPCl$_2$)$_m$, in which m is an integer from 3 to 7, with the cyclic trimer and tetramer often comprising up to 90% of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° C. to about 300° C., pressures can range from a vacuum of less than about 10$^{-1}$ Torr to superatmospheric and times can range from 30 minutes to about 48 hours.

A preferred process for preparing the poly(dichlorophosphazene) polymers used in the process of this invention is described in the aforementioned incorporated U.S. Pat. No. 4,005,171.

II. CYANO CONTAINING COMPOUNDS

Compounds which can be employed in producing the polymers of the invention are cyanamide or the alkali metal salts of dicyanamide such as sodium dicyanamide. The cyanamide molecules attach to the polyphosphazene nucleus by losing a hydrogen from an amino group and displacing a chlorine atom on the poly(dichlorophosphazene) to form a nitrogen-phosphorus linkage. When the alkali metal salt of dicyanamide is used, the alkali metal cation is displaced.

III. ADDITIONAL REACTIVE COMPOUNDS

As indicated heretofore, the polyphosphazene copolymers of the invention in addition to the cyanamido or dicyanamido substituent groups can contain substituted or unsubstituted alkoxy, aryloxy, amino or mercapto groups.

Preferred substituent groups represented by X' for use in these copolymers are:

Alkoxy groups (substituted or unsubstituted) derived from aliphatic alcohols having from 1 to 20 carbon atoms such as methanol, ethanol, propanol, isopropanol, n-butanol, sec-butanol, hexanol, dodecanol and the like; fluoroalcohols, especially those represented by the formula Z(CF$_2$)$_n$CH$_2$OH in which Z is hydrogen or fluorine and n is an integer from 1 to 10 as illustrated by trifluoroethanol; 2,2,3,3,3-pentafluoropropanol; 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols can be employed.

Aryloxy groups (substituted or unsubstituted) derived from aromatic alcohols including among others phenol; alkylphenols such as cresols, xylenols, p-, o-, and m- ethyl and propyl phenols and the like; halogen-substituted phenols such as p-, o-, and m-chloro- and bromo-phenols and di- or tri-halogen substituted phenols and the like; and alkoxy-substituted phenols such as 4-methoxyphenol, 4-(n-butoxy) phenol and the like. Mixtures of the foregoing aromatic alcohols can also be employed.

Amino groups derived from any of the amino compounds heretofore employed in the polyphosphazene polymer art. Thus, the amino groups can be derived from aliphatic primary and secondary amines such as methylamine, ethylamine, dimethylamine, ethylmethylamine and the like and aromatic amines such as those described in U.S. Pat. No. 4,042,561 (hereby incorporated by reference) as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Pat. No. 3,974,242 to Lanier et al (hereby incorporated by reference) may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan, and the like.

The preferred substituents groups for the formation of a polyphosphazene copolymer are formed from trifluoroethanol and methanol.

IV. THE TERTIARY AMINE

The use of tertiary amine is preparing the polymers of the invention minimizes undesirable side reactions and at the same time acts as an effective acid scavenger.

Tertiary amines which can be employed in preparing the polymers of the invention are those represented by the general structure:

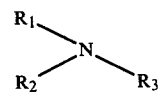

wherein R$_1$, R$_2$ and R$_3$ can each be alkyl containing from 1 to 8 carbon atoms. Thus, for example, the tertiary amine can be a trialkyl amine such as trimethylamine, triethylamine, tri-isopropylamine, tri-n-propylamine, tri-isobutylamine, tri-n-butylamine, and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethylethylene diamine; pyridine, N-methyl morpholine; N-methyl pyrrole; 1,4-diaza-bicyclo (2.2.2) octane (DABCO) and dipiperidyl ethane.

As indicated above, the polymers of the present invention are prepared by reacting the poly(dichlorophosphazene) polymer and cyanamide or the alkali metal salt of dicyanamide in the presence of a tertiary amine. Optionally, compounds listed in the group of "Additional Reactive Compounds" which may be substituted onto the poly(dichlorophosphazene) in the presence of a tertiary amine can be employed in the reaction mix.

The specific reaction conditions and proportion of ingredients employed in preparing these polymers can vary somewhat depending on factors such as the reactivity of cyanamide or of the dicyanamide salt, the particular tertiary amine employed, and the degree of substitution desired in the finished polymer. In general, reaction temperatures can range from about 25° C. to about 200° C. and times can range from 3 hours up to 7 days; lower temperatures necessitating longer reaction times and higher temperatures allowing shorter reaction times.

These conditions are, of course, utilized in order to obtain the most complete reaction possible, i.e., in order to insure the substantial conversion of the chlorine atoms on the backbone of the starting polymer to the corresponding derivative of the active hydrogen-containing compound and form a substantially hydrolytically stable polymer.

The above reaction is ordinarily carried out in the presence of a solvent. The solvent employed in the reaction should be a solvent for the poly(dichlorophosphazene) polymer, the cyanamide or the dicyanamide salt, and the tertiary amine. Examples of suitable solvents which may be employed include diglyme, triglyme, tetraglyme, cyclohexane, chloroform, dioxane, dioxolane, methylene chloride, toluene, xylene and tetrahydrofuran. The amount of solvent employed is not critical and any amount sufficient to solubilize the reaction mixture materials can be employed. In addition, the materials in the reaction zone should be reasonably free of water. The prevention of substantial amounts of water in the reaction system is necessary in order to inhibit the undesirable sidereaction of the available chlorine atoms in the chloropolymer. Preferably the reaction mixture should contain less than about 0.01% water.

In general, the amount of the cyanamide or alkali metal salt of dicyanamide employed in the process should be at least molecularly equivalent to the number of available chlorine atoms in the polymer mixture if a homopolymer is desired. However, preferably, an excess of such compounds, should be employed in order to insure complete reaction of all the available chlorine atoms.

While the cyanamido or dicyanamido substituted poly(phosphazene) polymers of the present invention have been prepared in the above-identified manner, that is, in the presence of a tertiary amine, alternative methods of preparation are available. The prior art methods of poly(dichlorophosphazene) substitution such as by reaction with sodium alkoxide as demonstrated in U.S. Pat. No. 3,370,020 to Allcock et al. can be used to substitute both the dicyanamido substituent groups derived from sodium dicyanamide and the substituents derived from the compounds listed in the list of additional reactive compounds.

The prior art methods can be used to substitute all of the above-identified substituents onto the poly(dichlorophosphazene) or can be used to partially substitute the poly(dichlorophosphazene) with groups other than cyanamido groups whereas the remaining chlorines on the partially substituted poly(dichlorophosphazene) are then replaced with cyanamido groups using the tertiary amine substitution process.

The following examples are submitted for the purpose of further illustrating the nature of the present invention and are not intended as a limitation on the scope thereof. Parts and percentages referred to in the example and throughout the specification are by weight unless otherwise indicated. All temperatures are degrees Centigrade unless otherwise specified.

EXAMPLE 1

Preparation of —[(NCNH) (CF$_3$CH$_2$O) PN]—

A 10 oz. bottle was charged with 44 cc (44 millimoles) of a dry 1.0 M solution of cyanamide in tetrahydrofuran (hereinafter THF), 100 cc of dry THF, 12.3 cc (88 millimoles) of dry triethylamine, 3.2 cc (44 millimoles) of trifluoroethanol and 52.7 gms (40.2 millimoles) of a 8.83 percent THF solution of poly(dichlorophosphazene). The material in the bottle was maintained at 80° C. for 20 hours. The 600 cm$^{-1}$ PCl in the IR spectrum was substantially removed by heating, and subsequent coagulation of the polymeric material in hexane yielded 9.1 gms of a grey powder that had a Tg of −71° C. and a Tm of 96° C.

An analysis of the polymeric product showed the following results:

|  | C | H | N | P | Cl |
|---|---|---|---|---|---|
| Actual (%) | 30.87 | 6.35 | 10.22 | 12.22 | 6.83 |
| Calculated (%)* | 30.93 | 4.81 | 10.19 | 12.33 | 7.41 |

*Based on 28.8% triethylamine . HCl, 4.2% hydrolyzed chloropolymer, 3.8% NH$_2$CN derivative and the remainder CF$_3$CH$_2$OH derivative.

EXAMPLE 2

Preparation of —[(NCNH)$_2$PN]—

A 10 oz. bottle was charged with 88 cc (88 millimoles) of a dry 1.0 M solution of cyanamide in THF, 20 cc of dry THF, 12.3 cc (88 millimoles) of dry triethylamine, and 13.7 gms (40.0 millimoles) of a 33.9 percent solution of poly(dichlorophosphazene) in cyclohexane. The material in the bottle was maintained at 80° C. for 20 hours. Subsequent coagulation of the polymeric material in hexane yielded 5.7 gms of a yellow rubbery product.

EXAMPLE 3

Preparation of —[(NCNH) (CH$_3$O)PN]—

A 10 oz. bottle was charged with 44 cc (44 millimoles) of a dry 1.0 M solution of cyanamide in THF, 60 cc of dry THF, 12.3 cc (88 millimoles) of triethylamine, 1.8 cc (44 millimoles) of methanol, and 13.6 gms (39.8 millimoles) of a 33.9 percent solution of poly(dichlorophosphazene) in cyclohexane. The material in the bottle was maintained at 80° C. for 20 hours. The resulting product was THF insoluble and 4.04 gms of a white rubber was recovered from the reaction mix upon water washing of the salt layer.

EXAMPLE 4

Preparation of —[((NC)$_2$N) (CF$_3$CH$_2$O)PN]—

A 10 oz. bottle was charged with 3.92 gms (44 millimoles) of sodium dicyanamide, 100 cc of dry THF, 17.12 cc (44 millimoles) of a 2.57 M THF solution of sodium trifluoroethoxide. A thick, viscous solution was formed which upon heating for 68 hours at 80° C. changed only slightly. The excess base was neutralized with CO$_2$ and the salt was nucleated through the addition of 5 cc of 10 percent aqueous sodium bromide. Centrifugation and coagulation in hexane yielded 4.2 gms of a tan powder having a Tg=36° C. and Tm=90° C. An additional 5.4 gms of polymer was produced upon water washing of the salt layer.

EXAMPLE 5

Preparation of —[((CN)$_2$N)$_2$PN]—

A 10 oz. bottle was charged with 13.36 gms (150 millimoles) of sodium dicyanamide, 150 cc of THF and 23.1 gms (67.6 millimoles) of a 33.9 percent solution of poly(dichlorophosphazene) in cyclohexane. The material in the bottle was maintained at 80° C. for 20 hours. The resulting product was THF insoluble and 16.4 gms of a white rubber polymer was obtained upon water washing of the salt layer.

EXAMPLE 6

Preparation of —[((NC)$_2$N) (CH$_3$O)PN]—

A 10 oz. bottle was charged with 3.92 gms (44 millimoles) of sodium dicyanamide, 100 cc of THF, 1.8 cc (44 millimoles) of methanol, 12.3 cc (88 millimoles) of triethylamine, and 13.7 gms (40.0 millimoles) of a 33.9 percent solution of poly(dichlorophosphazene) in cyclohexane. The material in the bottle was maintained at 80° C. for 20 hours to yield 7.17 gms of a THF insoluble white powder which was recovered by water washing of the salt layer.

EXAMPLE 7

Preparation of [(NCHN) (p-ClC$_6$H$_5$O)PN]

A 10 oz. bottle was charged with 44 cc (44 millimoles) of a dry 1.0 M solution of cyanamide in chloroform, 100 cc of dry chloroform, 5.66 gms (44 millimoles) of p-chlorophenol, 12.3 cc (88 millimoles) of triethylamine and 63.8 gms (40.0 millimoles) of a 7.26 percent solution of poly(dichlorophosphazene) in chloroform. The bottle was heated to 120° C. and maintained at that temperature for 68 hours at which time the polymer precipitated from solution. The solid polymer was isolated by decanting and methanol washing to yield 5.3 gms of a brown colored solid material.

We claim:

1. A polyphosphazene polymer containing unit represesented by the formulas:

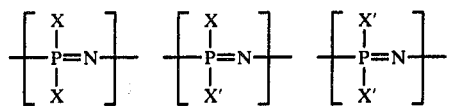

wherein X is

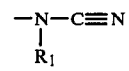

in which R$_1$ is independently selected for each unit from the group consisting of hydrogen and CN and wherein X' is the same as X or is selected from the group consisting of substituted and unsubstituted alkoxy, aryloxy, amino, and mercapto radicals and mixtures of the radicals.

2. The polymer of claim 1 in which X and X' are derived from cyanamide.

3. The polymer of claim 1 in which X and X' are derived from the alkali metal salt of dicyanamide.

4. The polymer of claim 1 in which X is derived from a mixture of cyanamide and sodium dicyanamide.

5. The polymer of claim 1 wherein X is selected from the group consisting of —N(CN)$_2$ and —NHCN and X' is selected from the group consisting of substituted and unsubstituted alkoxy, aryloxy, amino and mercapto groups wherein the units of the polyphosphazene polymer are randomly distributed.

6. The polymer of claim 5 wherein X is —NHCN and X' is selected from the group consisting of —OCH$_2$CF$_3$ and —OCH$_3$.

7. The polymer of claim 5 wherein X is —N(CN)$_2$ and X' is selected from the group consisting of —OCH$_2$CF$_3$ and —OCH$_3$.

8. The polymer of claim 5 wherein X is selected from the group consisting of —NHCN and —N(CN)$_2$ and X' is —OC$_6$H$_4$-p-Cl.

9. A method of preparing polyphosphazene polymers containing units represented by the formulas:

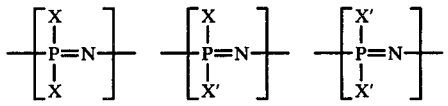

wherein X is

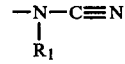

in which R$_1$ is hydrogen or —CN and wherein X' is the same as X or is selected from the group consisting of substituted or unsubstituted alkoxy, aryloxy, amino or mercapto groups; said method comprising reacting a poly(dichlorophosphazene) polymer having the formula —(NPCl$_2$)$_n$—, wherein n is from 20 to 50,000, with a cyanamide containing compound or a mixture consisting of a cyanamide containing compound and a compound selected from the group consisting of a substituted or unsubstituted alkanol, aromatic alcohol, amine, or mercaptan and mixtures thereof in the presence of a tertiary amine.

10. The method of claim 9 wherein the cyanamide containing compound is cyanamide.

11. The method of claim 9 wherein the cyanamide containing compound is sodium dicyanamide.

12. The method of claim 9 wherein the mixture consists of cyanamide and trifluoroethanol.

13. The method of claim 9 wherein the mixture consists of sodium dicyanamide and trifluoroethanol.

14. The method of claim 9 wherein the mixture consists of cyanamide and 4-chlorophenol.

15. The method of claim 9 wherein the mixture consists of sodium dicyanamide and 4-chlorophenol.

16. The method of claim 9 wherein the mixture consists of cyanamide and methanol.

17. The method of claim 9 wherein the mixture consists of sodium dicyanamide and methanol.

18. The method of claim 9 wherein the tertiary amine is triethylamine.

* * * * *